C. KULLMER.
WEATHER MAP.
APPLICATION FILED JAN. 11, 1909.
1,002,851.
Patented Sept. 12, 1911.
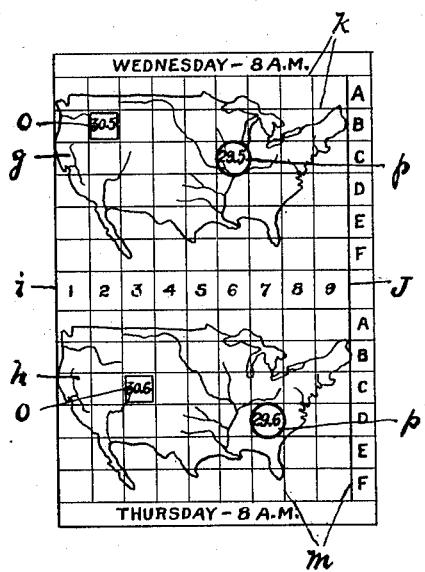
Witnesses.
A. C. Thomas
W. E. Chase
Inventor.
Charlie Kullmer
By.
Howard P. Denison
Attorney.

UNITED STATES PATENT OFFICE.

CHARLES KULLMER, OF SYRACUSE, NEW YORK.

WEATHER-MAP.

1,002,851. Specification of Letters Patent. Patented Sept. 12, 1911.

Application filed January 11, 1909. Serial No. 471,687.

*To all whom it may concern:*

Be it known that I, CHARLES KULLMER, of Syracuse, in the county of Onondaga, in the State of New York, have invented new and useful Improvements in Weather-Maps, of which the following, taken in connection with the accompanying drawings, is a full, clear, and exact description.

This invention relates to certain improvements in weather maps for indicating the geographical positions and relative movements of the centers of area of extreme barometric conditions, for predetermined intervals of time. In other words, I have sought to provide a simple and efficient educational appliance comprising duplicate geographical maps adapted to be printed and published at regular intervals in juxtaposition on a single sheet (usually in the daily newspapers) whereby the general public may readily understand the movements of varying atmospheric conditions so that any one of average intelligence may forecast with reasonable certainty the approximate weather conditions at any predetermined geographical point by merely comparing the positions of the indicated barometric pressures in one geographical outline with those in the other geographical outline.

The general eastward movement of the atmosphere and its effect in continually shifting the regions of high and low atmospheric pressures are well known to educators and specialists in this science but is not easily nor fully comprehended by the general public and my main object is to promote a more general interest in and understanding of such conditions and relations.

In the drawings is shown an educational appliance embodying the various features of my invention and comprising duplicate maps —*g*— and —*h*— of the United States arranged one over the other in a vertical column and bounded on the east and west side by parallel vertical lines —*i*— and —*j*— spaced apart a distance corresponding to the width of an ordinary newspaper column so that the maps may be printed or otherwise impressed one over the other within said vertical lines with corresponding geographical points on each map in the same vertical plane.

The surface of each map is divided by a series of horizontal lines —*k*— and a series of vertical lines —*m*— forming a multiplicity of rectangular (preferably square) spaces, the spaces between the horizontal lines being designated by the letters A, B, C, D, E and F while the vertical spaces between the lines —*m*— are designated by the reference numerals 1 to 9 inclusive. Each square space may, therefore, be designated by a combination of one of the letters with one of the numerals as for instance the extreme upper left hand square would be referred to as A–1 while the extreme lower right hand square would be designated as F–9; further illustrations of other spaces being brought out in the following description. Each map bears upon its face one or more, in this instance two, weather indicating characters —*o*— and —*p*—, each of which is printed or otherwise impressed in one of the squares, those on each map representing respectively the centers of area or region of high and low barometric conditions or clear and cloudy weather. The character which indicates clear cold weather preferably consists of a square formed of light lines inclosing the proper numeral to indicate the degree of atmospheric pressure. The other character on the same map preferably comprises a heavy circular line inclosing the proper barometric numeral to indicate cloudy or rainy weather. These numerals correspond to the usual code used by the government officials to indicate different barometric pressures and are usually reported from day to day from different geographical points in the country which the map represents. These numerals together with their inclosing lines constitute symbols to indicate the centers of area or regions of extreme high and low pressure and are printed in the squares upon one of the maps corresponding to the geographical points from which the reports are received on a certain day and hour, similar symbols being printed upon the other map from reports received from the same or different geographical points on the next day or succeeding period of time so that by comparing the geographical positions of the symbols last reported on one map with the corresponding symbols previously reported on the other map, the direction and relative speed of movement of the centers of area or region of pressures which such symbols represent may be readily ascertained, it being understood that the size of each space or square is approximately proportionate to the average amount of movement for each day of 24 hours of the center of area of high or low pressure.

The general direction of movement will, of course, be from west to east and by comparing the symbols of one map with those of the other, any person of ordinary intelligence may forecast what the weather will be some time in advance of its approach and at the same time this system of comparison gives a clear understanding of the principle by which scientists are enabled to predetermine what the weather conditions will be at any geographical point a considerable time in advance of its occurrence. For example, assume that the official report from certain localities on a certain day, as Wednesday, were given out, usually by wire, as B–2—30.5 and C–6—29.5, the first report indicating clear cold weather while the second report indicates cloudy or rainy weather then the symbols corresponding to such weather conditions are printed at their respective geographical points upon the map bearing the name of the day, as Wednesday, upon which the reading is made. Now assume that the official reports for the next day, as Thursday, are given out as C–3 and D–7 then the corresponding symbols are printed in their proper corresponding positions on the other map thus indicating at a glance that the centers of area at extreme barometric conditions have moved southward and eastward a certain distance in twenty four hours so that the casual observer may predict with reasonable accuracy where such weather conditions as indicated by the symbols will be the next day or at least twenty four hours in advance and may also predetermine by the numerals whether or not such extreme conditions are gradually being intensified or reduced.

The symbols upon the map are printed from type set up to correspond in number, form and arrangement to the squares on such map so that the type are interchangeable from one square to another to enable the symbols to be shifted from one geographical position to another on the map in accordance with the reported weather conditions from different geographical points.

The type and their relative arrangement form no part of my present invention and are simply mentioned to illustrate the method of shifting position of the symbols although applicant reserves the right to file a separate application upon the particular form of type used in the production of this map.

It will be understood from the foregoing description taken in connection with the drawings that by the use of my improved weather reporting symbols, the transmission by telegraph of complete information relative to weather conditions from any point is materially simplified by reason of the fact that such information is conveyed or transmitted by means of a minimum number of telegraphic characters. In other words, by the use of this system of symbols transmission of full information with reference to the weather conditions to newspapers and similar periodicals is made possible whereas under the system now in general use, such information is practically excluded.

Another important feature of my invention lies in the formation of the symbols or characters of such relative area as compared with that of the map, that the average daily movement or shift of any reported weather condition is at least equal to the area of such symbol.

What I claim is:

1. A weather map consisting of a single sheet bearing duplicate geographical outlines one above the other with corresponding geographical points in one and the same straight vertical line, said sheet bearing characters representing different days, one for each geographical outline, and also bearing within such outlines numerals representing barometric pressures of the same storm center on the days indicated whereby a comparison of such numerals in the duplicate geographical outlines will determine the direction and amount of movement of the storm center during the interval between the days indicated.

2. A weather map consisting of a single sheet bearing duplicate geographical outlines disposed one above the other with corresponding geographical points in one and the same vertical line, parallel vertical lines impressed uniform distances apart upon the sheet and across the spaces within such duplicate outlines, additional parallel straight lines impressed upon the sheet and across the spaces within said outlines at right angles to and the same distance apart as the vertical lines, different characters impressed on the sheet in coincidence with the spaces between the lines of each set, additional characters representing different days of a week impressed on the sheet, one for each outline, and weather indicating characters impressed upon the sheet within said outlines.

In witness whereof I have hereunto set my hand this 2nd day of December 1908.

CHARLES KULLMER.

Witnesses:
H. E. CHASE,
C. M. MCCORMACK.

Copies of this patent may be obtained for five cents each, by addressing the "Commissioner of Patents, Washington, D. C."